(12) United States Patent
Han et al.

(10) Patent No.: US 9,690,347 B2
(45) Date of Patent: Jun. 27, 2017

(54) ELECTRONIC DEVICE

(71) Applicants: Inventec (Pudong) Technology Corporation, Shanghai (CN); INVENTEC CORPORATION, Taipei (TW)

(72) Inventors: Ying-Xian Han, Shanghai (CN); Jian-Xin Huang, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 132 days.

(21) Appl. No.: 14/919,746

(22) Filed: Oct. 22, 2015

(65) Prior Publication Data

US 2017/0060714 A1 Mar. 2, 2017

(30) Foreign Application Priority Data

Aug. 26, 2015 (CN) .......................... 2015 1 0532192

(51) Int. Cl.
| G06F 1/00 | (2006.01) |
| G06F 1/28 | (2006.01) |
| G06F 1/30 | (2006.01) |
| G06F 1/26 | (2006.01) |

(52) U.S. Cl.
CPC .................. G06F 1/28 (2013.01); G06F 1/26 (2013.01); G06F 1/30 (2013.01)

(58) Field of Classification Search
CPC ... G06F 1/28; G06F 1/26; G06F 1/263; G06F 1/30; G06F 1/3221; G06F 11/0727; G06F 11/0751; G01R 31/2801; G01R 31/2818
See application file for complete search history.

(56) References Cited

U.S. PATENT DOCUMENTS

| 6,351,375 B1 * | 2/2002 | Hsieh ...................... G06F 1/184 361/679.33 |
| 6,597,073 B1 * | 7/2003 | Check ...................... G06F 1/30 307/130 |
| 6,833,634 B1 * | 12/2004 | Price ........................ G06F 1/26 307/18 |
| 7,162,654 B1 * | 1/2007 | Price ........................ G06F 1/30 326/30 |

(Continued)

FOREIGN PATENT DOCUMENTS

TW 457475 10/2001

*Primary Examiner* — Michael Maskulinski
*Assistant Examiner* — Anthony J Amoroso
(74) *Attorney, Agent, or Firm* — CKC & Partners Co., Ltd.

(57) ABSTRACT

A HDD backboard includes a power detecting circuit and a first working circuit. The power detecting circuit is configured to determine whether a plurality of voltage rails of the HDD backboard are normal, so as to output a power detecting signal. The first working circuit is coupled with the power detecting circuit and configured to receive the power detecting signal and output an HDD backboard determining signal. The motherboard includes a second working circuit and a CPLD. The CPLD is configured to receive the HDD backboard determining signal The CPLD is configured to determine whether the HDD backboard is absent when the electronic device operates in a standby mode and determine whether the voltage rails are failed when the electronic device operates in a working mode.

12 Claims, 4 Drawing Sheets

(56) References Cited

U.S. PATENT DOCUMENTS

| | | | |
|---|---|---|---|
| 8,522,064 B2* | 8/2013 | Yu | G06F 1/206 |
| | | | 710/301 |
| 9,251,839 B1* | 2/2016 | Agness | G11B 19/2081 |
| 2003/0188203 A1* | 10/2003 | Park | G06F 1/26 |
| | | | 713/300 |
| 2006/0212755 A1 | 9/2006 | Urmanov | |
| 2011/0241893 A1* | 10/2011 | Jordan | G06F 1/30 |
| | | | 340/663 |
| 2014/0115312 A1* | 4/2014 | Sun | G06F 9/4401 |
| | | | 713/2 |
| 2015/0135002 A1 | 5/2015 | Harpaz et al. | |
| 2015/0186064 A1 | 7/2015 | Chen et al. | |
| 2016/0283336 A1* | 9/2016 | Petersen | G06F 11/2015 |

* cited by examiner

ELECTRONIC DEVICE

RELATED APPLICATIONS

This application claims priority to Chinese Application Serial Number 201510532192.5, filed Aug. 26, 2015, which is herein incorporated by reference.

BACKGROUND

Field of Invention

The present invention relates to an electronic device. More particularly, the present invention relates to an electronic device about a power good detecting signal and a hard-disk drive detecting signal sharing the same output pin.

Description of Related Art

As technology continues to progress, there is a growing need for operating ability and data storage capacitance of server. Therefore, to meet the storage specification of server, there is a need to install a variety of hard-disk drives (HDDs) in server. For example, 24 2.5-inches HDDs (SFF HDD) or 12 3.5-inches HDDs (LFF HDD) are installed in a HDD backboard at the same time.

However, it is hard to distinguish between LFF HDD and SFF HDD in conventional server. Therefore, users can not analysis and install HDDs well, furthermore, users can not call the right fan table and ensure the system under a normal operation. On the other hand, there are many voltage rails (a single voltage provided by power supply unit) in a HDD backboard. With the increased number of HDDs and voltage rails, it is hard to efficiently determine whether HDDs and voltage rails are abnormal.

Therefore, it is very important in this area to design a server which is easy to analysis the HDDs and the power rails.

SUMMARY

The invention provides an electronic device including a hard-disk drive (HDD) and a motherboard. The HDD backboard includes a power detecting circuit and a first working circuit. The power detecting circuit is configured to determine whether a plurality of voltage rails of the HDD backboard are normal, so as to output a power detecting signal. The first working circuit is coupled with the power detecting circuit and configured to receive the power detecting signal and output an HDD backboard determining signal. The motherboard includes a second working circuit and a complex programmable logic device (CPLD). The second working circuit is coupled with the first working circuit. The CPLD is coupled with the first working circuit and the second working circuit, and configured to receive the HDD backboard determining signal. In which the CPLD is configured to determine whether the HDD backboard is absent when the electronic device operates in a standby mode, and determine whether the voltage rails are failed when the electronic device operates in a working mode, In one embodiment of the present disclosure, the CPLD is configured to determine the type of the HDD backboard when the electronic device operates in the standby mode. In which the CPLD is configured to output a first voltage level when the HDD backboard is a first HDD backboard, and the CPLD is configured to output a second voltage level when the HDD board is a second HDD backboard.

In one embodiment of the present disclosure, the power detecting signal is a first voltage level when one of the voltage rails is failed, and the power detecting signal is a second voltage level when all of the voltage rails are normal.

In one embodiment of the present disclosure, the CPLD is configured to call a fan table according to the type of the HDD backboard.

In one embodiment of the present disclosure, the electronic device includes a working power supply configured to provide a working voltage, and a standby power supply is configured to provide a standby voltage. In which the working voltage is a third voltage level and the standby voltage is a fourth voltage level when the electronic device operates in the standby mode, and the working voltage is the fourth voltage level and the standby voltage is the third voltage level when the electronic device operates in the working mode.

In one embodiment of the present disclosure, the first working circuit includes a third working circuit and a fourth working circuit when the HDD backboard is the first HDD backboard The third working circuit includes a first switch and a second switch. The first switch is coupled with the power detecting circuit and the CPU), in which the working power supply is coupled with a control terminal of the first switch. The second switch is coupled with the CPLD and one terminal of a first dividing resistor, in which the working power supply is coupled with a control terminal of the second switch via another terminal of the first dividing resistor. The fourth working circuit includes a pull-down resistor coupled with the CPLD and a ground terminal. The second working circuit includes a second dividing resistor coupled with the standby power supply and the CPLD.

In one embodiment of the present disclosure, the first switch and the second switch of the third working circuit are turned off when the electronic device operates in the standby mode so as to divide the standby voltage via the second dividing resistor and the fourth working circuit, and generate the HDD backboard determining signal.

In one embodiment of the present disclosure, the first working circuit comprises a third working circuit when the HDD backboard is the second HDD backboard. The third working circuit includes a first switch and a second switch. The first switch is coupled with the power detecting circuit and the CPLD, in which the working power supply is coupled with a control terminal of the first switch. The second switch is coupled with the CPLD and one terminal of a first dividing resistor, in which the working power supply is coupled with a control terminal of the second switch via another terminal of the first dividing resistor. The second working circuit comprises a second dividing resistor coupled with the standby power supply and the CPLD.

In one embodiment of the present disclosure, the first switch and the second switch of the first working circuit are turned off when the electronic device operates in the standby mode so as to provide the standby voltage to the HDD backboard determining signal.

In one embodiment of the present disclosure, the first switch is configured to prevent current leakage from the motherboard to the HDD backboard so as to protect the HDD backboard.

In one embodiment of the present disclosure, the power detecting circuit is configured to receive a plurality of power good signals, wherein the power good signals are configured to reflect the status of the power rails.

Users can determine the type of HDD backboard when the electronic device operates in the standby mode and detect the failure of voltage rails of the HDD backboard when the electronic device operates in the working mode with the same pin of the CPLD according to HDD backboard determining signal. Therefore, without increasing the number of CPLD pins, users can analysis different HDD backboards so as to arrange the HDD backboards correctly and detect the failure of voltage rails according to the HDD backboard determining signal. Thus, it is more efficient to debug the electronic device when there is error in the electronic device, It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
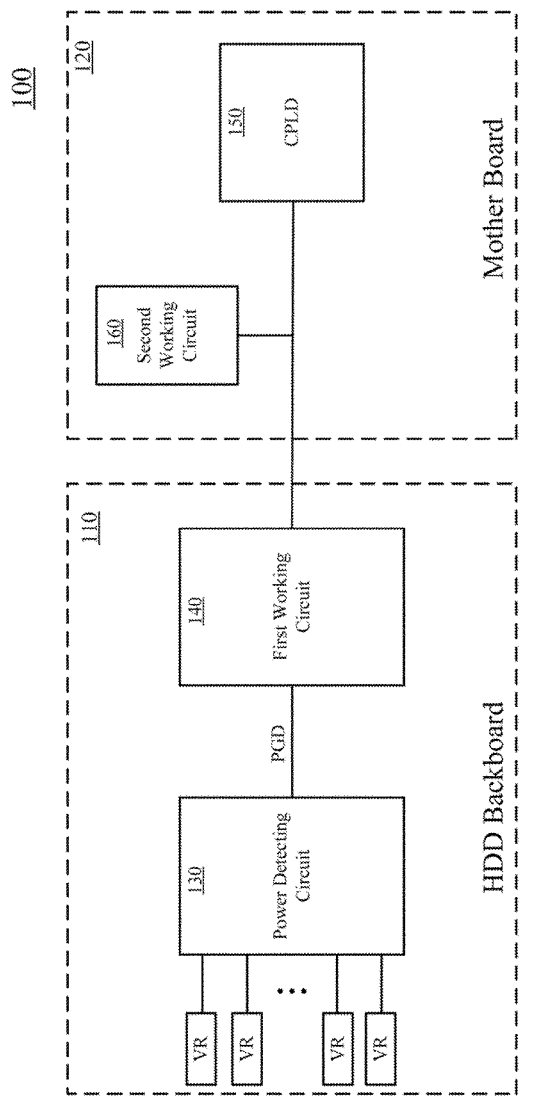
FIG. 1 is a schematic diagram illustrating an electronic device in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts, The terminology used herein is for the purpose of describing particular embodiments only and is not intended to be limiting of the invention. As used herein, the singular forms "a" "an" and "the" are intended to include the plural forms as well, unless the context clearly indicates otherwise. It will be further understood that the terms "comprises " and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms, In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other, Referring to FIG. 1, FIG. 1 is a schematic diagram illustrating an electronic device in accordance with one embodiment of the present disclosure. As illustrated in FIG. 1, an electronic device 100 includes a HDD backboard 110 and a motherboard 120. In which the HDD backboard 110 includes a power detecting circuit 130 and a first working circuit 140, and the motherboard 120 includes a complex programmable logic device (CPLD) 150 and a second working circuit 160.

The features and advantages of the electronic device 100 can be realized by the following embodiments. These and other features of the disclosure will become more apparent from the following description and appended claims, or can be learned by the practice of the principals set forth herein.

In one embodiment, as shown in FIG. 1 the power detecting circuit 130 is configured to detect whether a plurality of voltage rails VRs of the HDD backboard 110 are normal and to output a power good detecting signal PGD. The first working circuit 140 is coupled with the power detecting circuit 130 so as to receive the power good detecting signal PGD. The second working circuit 160 is coupled with the CPLD 150 and the first working circuit 140.

Figure 2A:
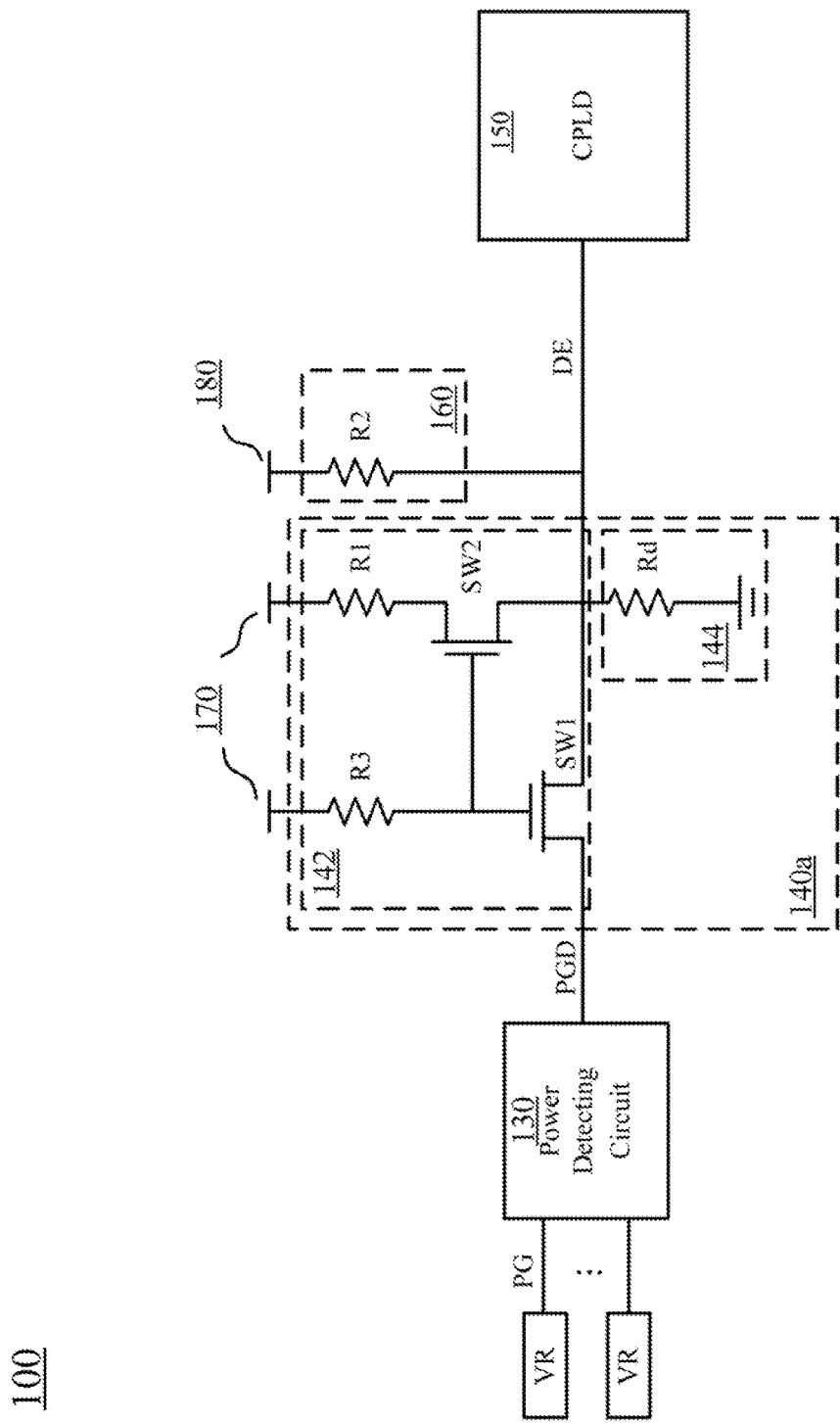
FIG. 2a is a schematic diagram illustrating an electronic device in accordance with one embodiment of the present disclosure.

Referring to FIG. 2a, FIG. 2a is a schematic diagram illustrating an electronic device in accordance with one embodiment of the present disclosure. As shown in FIG. 2a, the electronic device 100 includes a working power supply 170 and a standby power supply 180, in which the working power supply 170 is configured to provide a working voltage VWORK, and the standby power supply 180 is configured to provide a standby voltage VSTBY. When the electronic device 100 operates in a standby mode, the working voltage VWORK is low and the standby voltage VSTBY is high. When the electronic device 100 operates in a working mode, the working voltage VWORK is high and the standby voltage is low. The relations between the working voltage VWORK and the standby voltage VSTBY when the electronic device 100 operates in the standby mode and when the electronic device 100 operates in the working mode are not limited thereto. In one embodiment the high level of the working voltage VWORK and the high level of the standby voltage VSTBY are different.

In this embodiment, the HDD backboard 110 is a HDD backboard with 12 3.5-inches HDDs. In this embodiment, the first working circuit 140a includes a third working circuit 142 and a fourth working circuit 144. The third working circuit 142 includes a first switch SW1 and a second switch SW2, and the fourth working circuit 144 includes a pull-down resistor Rd. In which the first terminal of the first switch SW1 is coupled with the power detecting circuit 130, the second terminal of the first switch SW1 is coupled with the CPLD 150, and the working power supply 170 is coupled with the control terminal of the first switch SW1 through a resistor R3. The first terminal of the second switch SW2 is coupled with the CPLD, and the second terminal of the second switch SW2 is coupled with one terminal of a first dividing resistor R1. The working power supply 170 is coupled with the control terminal of the second switch SW2 and another terminal of the first dividing resistor R1. The pull-down resistor Rd is coupled between the CPLD 150 and ground. The second working circuit 160 includes a second dividing resistor R2, which is connected between the standby power supply 180 and the CPLD 150. For convenience and clarity, in this embodiment, the first switch SW1 and the second switch SW2 are NMOSs, in operation, the first switch SW1 and the second switch SW2 can be NMOS, PMOS or BJT.

In operation, when the electronic device 100 operates in the standby mode, the low working voltage VWORK controls the first switch SW1 and the second switch SW2 of the first working circuit 140a to be turned off, so as to divide the standby voltage VSTBY through the second dividing resistor R2 and the pull-down resistor Rd, and generate a HDD backboard determining signal DE. That is the HDD backboard determining signal DE is the result of the high standby voltage VSTBY divided by the second dividing resistor R2 and the pull-down resistor Rd. In one embodiment, the second dividing resistor R2 is 4700 ohm, the pull-down resistor Rd is 1000 ohm, and the high standby voltage VSTBY is 3.3V. Therefore, the HDD backboard determining signal DE is 0.57V, which is treated as a lower voltage. It is noteworthy that the first switch SW1 protects the HDD backboard 110 when the electronic device 100 operates in the standby mode and prevents current leakage from the motherboard 120 to the HDD backboard 110.

Figure 2B:
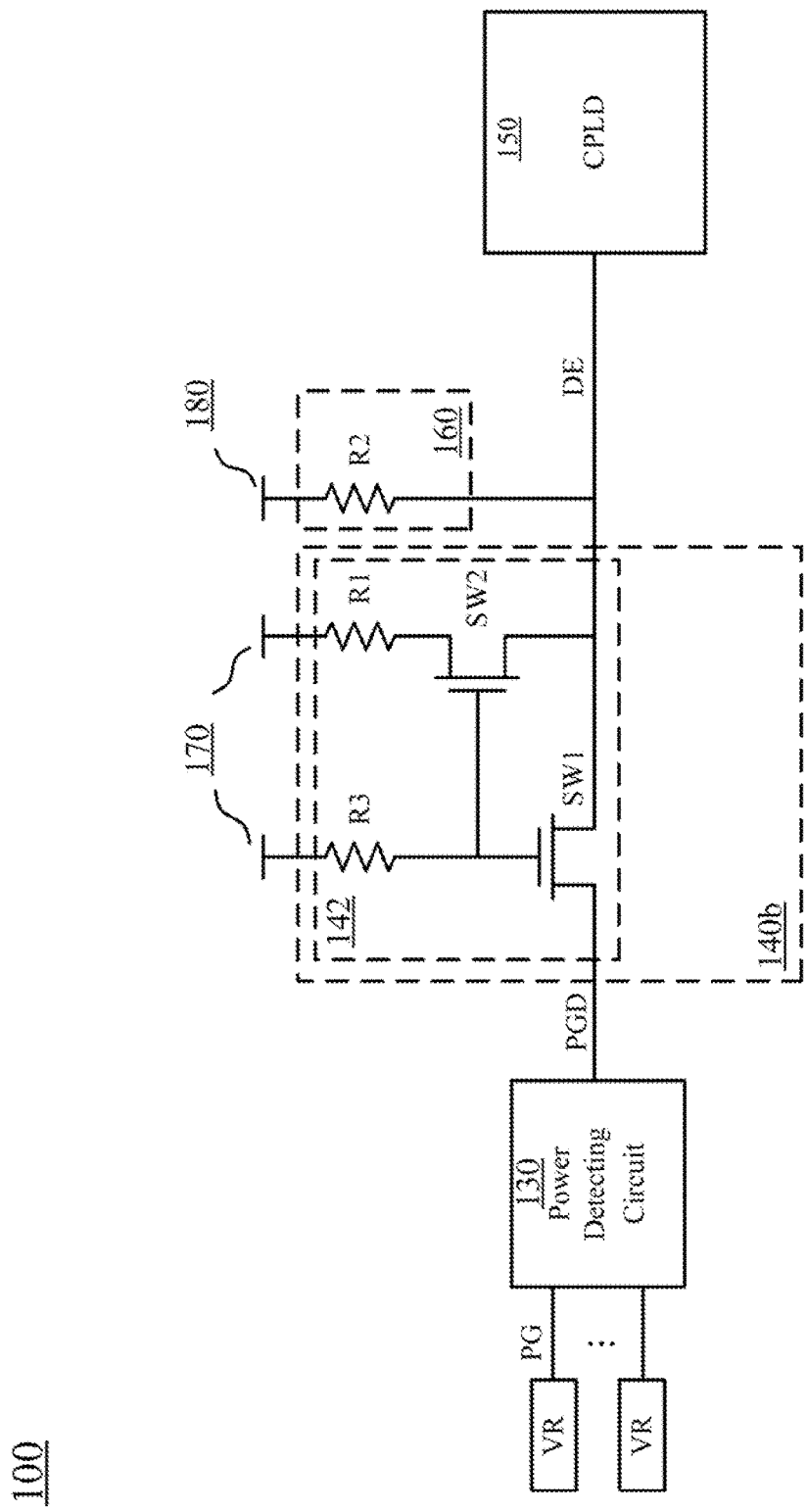
FIG. 2b is a schematic diagram illustrating another electronic device in accordance with one embodiment of the present disclosure.

Referring to FIG. 2b, FIG. 2b is a schematic diagram illustrating another electronic device in accordance with one embodiment of the present disclosure.

In this embodiment, the HDD backboard 100 can be a HDD backboard with 24 2.5-inches HDDs. In this embodiment, the first working circuit 140b includes a third working circuit 142. The third working circuit 142 includes a first switch SW1 and a second switch SW2. In which the first terminal of the first switch SW1 is coupled with the power detecting circuit 130, and the second terminal of the first switch SW1 is coupled with the CPLD 150. The working power supply 170 is coupled with the control terminal of the first switch SW1 through a resistor R3. The first terminal of the second switch SW2 is coupled with the CPLD 150, and the second terminal of the second switch SW2 is coupled with one terminal of a first dividing resistor R1 The working power supply 170 is coupled with the control terminal of the second switch SW2 and another terminal of the first dividing resistor R1 The second working circuit 160 includes a second dividing resistor R2, which is coupled between the standby power supply 180 and the CPLD 150.

In operation, when the electronic device 100 operates in the standby mode, the low working voltage VWORK controls the first switch SW1 and the second switch SW2 of the first working circuit 140b to be turned off. Meanwhile, the voltage level of the HDD backboard determining: signal DE is equal to the high standby voltage VSTBY (such as 3.3V), which is treated as a higher voltage level. It is noteworthy that the first switch SW1 protects the HDD backboard 110 when the electronic device 100 operates in the standby mode and prevents current leakage from the motherboard 120 to the HDD backboard 110.

Referring to FIGS. 2a and 2b the electronic device 100 may generate the HDD backboard determining signal DE at different voltage levels when the electronic device 100 includes different first working circuits (such as first working circuit 140a or first working circuit 140b). For example, the HDD backboard determining signal DE may be equal to the standby voltage VSTBY or the standby voltage VSTBY divided by the second dividing resistor R2 and the pull-down resistor Rd. Therefore, users can notice that the HDD backboard 110 is the HDD backboard with 24 2.5-inches HDDs or the HDD backboard with 12 35-inches HDDs.

It is noteworthy that in different embodiments, the HDD backboard with 24 2.5-inches HDDs may include the first working circuit 140a, and the HDD backboard with 12 3.5-inches HDDs may include the first working circuit 140b. Under this situation, the electronic device 100 can generate different voltage levels of the HDD backboard determining signal DE according to different first working circuit 140, so as distinguish between the HDD backboard with 24 2.5-inches HDDs and the HDD backboard with 12 3.5-inches HDDs.

In some embodiments, the first working circuit 140a and the first working circuit 140b can be used in different components so as to distinguish these components, but not limited thereto.

In one embodiment, the electronic device 100 controls the CPLD 150 according to the HDD backboard determining signal DE so as to change the status of lights on the motherboard 120 (not shown). In other words, the electronic device 100 controls the status of lights on the motherboard 120 according to different voltage levels of the HDD backboard determining signal DE of the first working circuit 140a and the first working circuit 140b. Thus, users can distinguish the type of HDD backboard in the electronic device 100 according to the status of lights.

In one embodiment, CPLD 150 issues the status of HDD backboard to a fan table (not shown), such as the type of the HDD backboard 140 or whether the voltage rails VRs are abnormal. Therefore, users can correctly arrange a variety of HDD backboards according to the information provided by the fan table, and analysis the HDD backboards at the same time.

Figure 3:
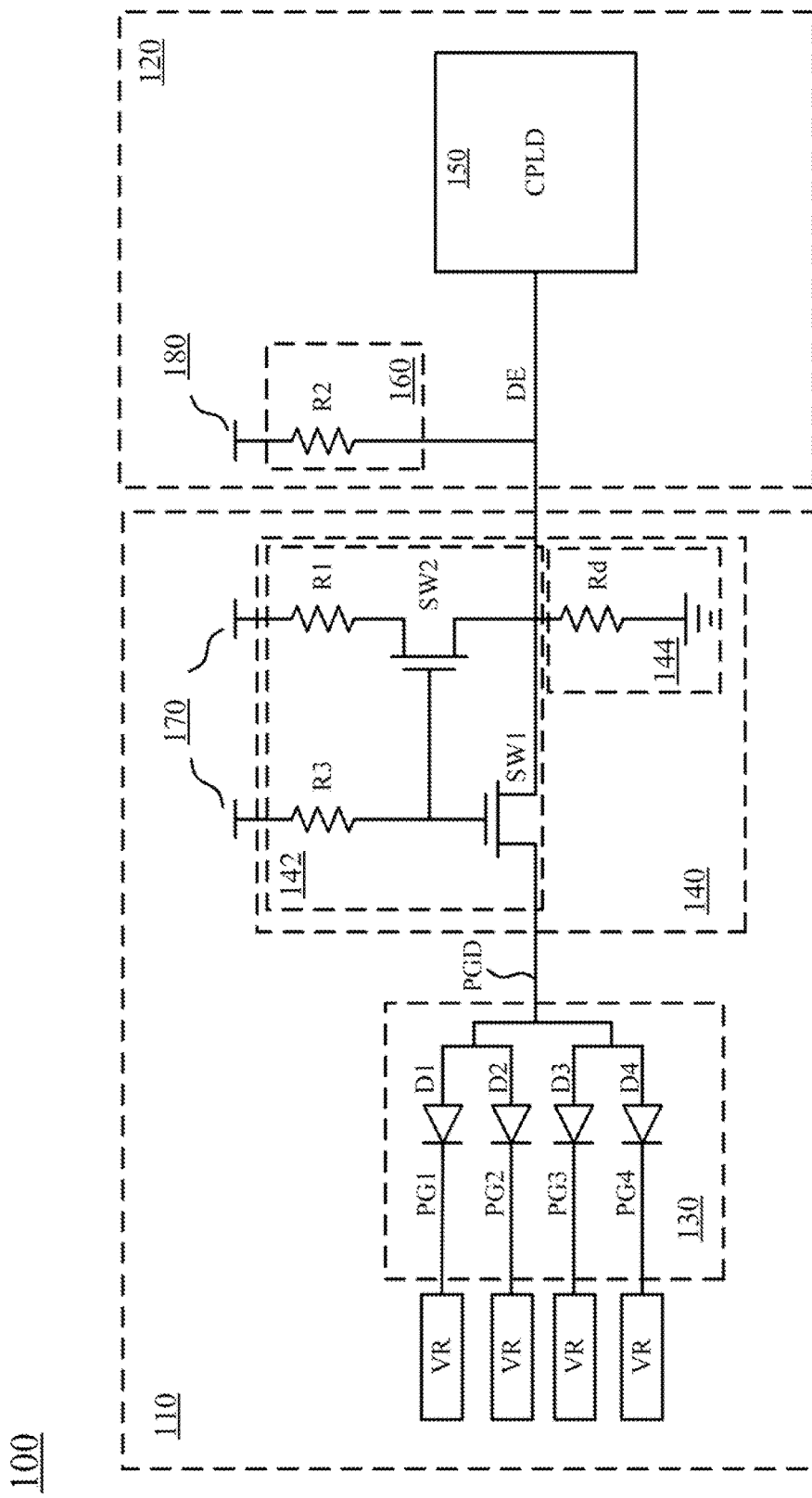
FIG. 3 is a schematic diagram illustrating an electronic device in accordance with one embodiment of the present disclosure

FIG. 3 is a schematic diagram illustrating an electronic device in accordance with one embodiment of the present disclosure. As shown in FIG. 3, a power detecting circuit 130 is configured to receive a plurality of power good signals (such as PG1~PG4) and generate a power good detecting signal PGD. The power good signals PG1~PG4 response to the status of power rails VRs. For example, a first power good signal PG1 responses to the status of 3.3V power rail, a second power good signal PG2 responses to the status of 1.8V power rail, a third power good signal PG3 responses to the status of 1V power rail, and a fourth power good signal PG4 responses to the status of 0.9V power rail. Those skilled in the art can adjust the number of the power good signal PG and the corresponding voltage rails.

For convenience and clarity, in this embodiment, the corresponding power good signal PG is high when the power rail is normal, and the corresponding power good signal PG is low when the power rail is abnormal. Those skilled in the art can define the corresponding voltage level of the power good signal PG of normal power rail, and define the corresponding voltage level of the power good signal PG of abnormal power rail. In this embodiment, the power detecting circuit 130 includes an AND gate, hence, the power detecting circuit 130 outputs a low power good detecting signal PGD while one of the power rails VRs is abnormal.

As shown in FIG. 3, in one embodiment, the power detecting circuit 130 includes a first diode D1, a second diode D2, a third diode D3 and a fourth diode D4. In which a cathode of the first diode D1 receives the first power good signal PCI, and an anode of the first diode D1 is coupled with the first working circuit 140. A cathode of the second diode D2 receives the second power good signal PG2, and an anode of the second diode D2 is coupled with the first working circuit 140. A cathode of the third diode D3 receives the third power good signal PG3, and an anode of the third diode D3 is coupled with the first working circuit 140. A cathode of the second diode D4 receives the fourth power good signal PG4, and an anode of the fourth diode D4 is coupled with the first working circuit 140. Hence, if one of the power good signals PG1~PG4 is low, the power good detecting signal PGD after the AND operation is low level. Therefore the abnormal situation of the power rails VRs can be detected with the power good detecting signal PGD. The diodes and AND gate described above is an embodiment of the present disclosure, those skilled in the art can utilize any circuit which can achieve AND function. It is noteworthy that only the first working circuit 140b is illustrated in FIG. 3. In other embodiments, the first working circuit 140a can replace the first working circuit 140b.

Moreover, the first dividing resistor R1 and the pull-down resistor Rd can be calculated to let the divided voltage (i.e. the HDD backboard determining signal DE) be equal to the voltage drop of the diodes D1~D4 of the power detecting circuit 130. Therefore, other circuits (such as the first working circuit 140 and the second working circuit 160) will not interrupt the judgment of the power detecting circuit 130.

Furthermore, when the electronic device 100 operates in the working mode, the high working voltage VWORK controls the first switch SW1 and the second switch SW2 of the first working circuit 140 to be turned on, so as to provide the power good detecting signal PGD to the CPLD 150 through the first switch SW1. In one embodiment, the electronic device 100 controls the CPLD 150 according to the HDD backboard determining signal DE, so as to change the status of lights on the motherboard 120 (not shown). Thus, the HDD backboard determining signal DE controls the lights on the motherboard 120 to perform different lights when the voltage rails are abnormal. Therefore, users can detect the abnormal situation of power rails VRs of the HDD backboard 110 from the status of lights.

Users can determine the type of HDD backboard when the electronic device 100 operates in the standby mode and detect the failure of voltage rails of the HDD backboard when the electronic device 100 operates in the working mode with the same pin of the CPLD according to HDD backboard determining signal. Therefore, without increasing the number of CPLD pins, users can analysis different HDD backboards so as to arrange different HDD backboards correctly and detect the failure of voltage rails according to the HDD backboard determining signal. Thus, it is more efficient to debug the electronic device when there is error in the electronic device.

Although the present invention has been described in considerable detail with reference to certain embodiments thereof, other embodiments are possible. Therefore, the spirit and scope of the appended claims should not be limited to the description of the embodiments contained herein.

What is claimed is:

1. An electronic device comprising:
   a hard-disk drive (HDD) backboard, comprising:
      a power detecting circuit configured to determine whether a plurality of voltage rails of the HDD backboard are normal so as to output a power detecting signal; and
      a first working circuit coupled with the power detecting circuit and configured to receive the power detecting signal and output an HDD backboard determining signal;
   a motherboard, comprising:
      a second working circuit coupled with the first working circuit;
      a complex programmable logic device (CPLD) coupled with the first working circuit and the second working circuit, and configured to receive the HDD backboard determining signal,
      wherein the CPLD is configured to determine whether the HDD backboard is absent when the electronic device operates in a standby mode, and determine whether the voltage rails are failed when the electronic device operates in a working mode.

2. The electronic device of claim 1, wherein the CPLD is configured to determine the type of the HDD backboard when the electronic device operates in the standby mode, wherein the CPLD is configured to output a first voltage level when the HDD backboard is a first HDD backboard, and the CPLD is configured to output a second voltage level when the HDD board is a second HDD backboard.

3. The electronic device of claim 2, wherein the CPLD is configured to call a fan table according to the type of the HDD backboard.

4. The electronic device of claim 2, further comprising:
   a working power supply configured to provide a working voltage; and
   a standby power supply configured to provide a standby voltage;
   wherein the working voltage is a third voltage level and the standby voltage is a fourth voltage level when the electronic device operates in the standby mode, and the working voltage is the fourth voltage level and the standby voltage is the third voltage level when the electronic device operates in the working mode.

5. The electronic device of claim 4, wherein the first working circuit comprises a third working circuit and a fourth working circuit when the HDD backboard is the first HDD backboard, and the third working circuit comprises:
   a first switch coupled with the power detecting circuit and the CPLD, wherein the working power supply is coupled with a control terminal of the first switch; and
   a second switch coupled with the CPLD and one terminal of a first dividing resistor, wherein the working power supply is coupled with a control terminal of the second switch via another terminal of the first dividing resistor:
   wherein the fourth working circuit comprises:
   a pull-down resistor coupled with the CPLD and a ground terminal;
   wherein the second working circuit comprises:
   a second dividing resistor coupled with the standby power supply and the CPLD.

6. The electronic device of claim 5, wherein the first switch and the second switch of the third working circuit are turned off when the electronic device operates in the standby mode so as to divide the standby voltage via the second dividing resistor and the fourth working circuit and generate the HDD backboard determining signal.

7. The electronic device of claim 5, wherein the first switch is configured to prevent current leakage from the motherboard to the HDD backboard so as to protect the HDD backboard.

8. The electronic device of claim 4, wherein the first working circuit comprises a third working circuit when the HDD backboard is the second HDD backboard, and the third working circuit comprises:
   a first switch coupled with the power detecting circuit and the CPLD, wherein the working power supply is coupled with a control terminal of the first switch; and
   switch coupled with the CPLD and one terminal of a first dividing resistor, wherein the working power supply is coupled with a control terminal of the second switch via another terminal of the first dividing resistor;
   wherein the second working circuit comprises:
   a second dividing resistor coupled with the standby power supply and the CPLD.

9. The electronic device of claim wherein the first switch and the second switch of the first working circuit are turned off when the electronic device operates in the standby mode so as to provide the standby voltage to the HDD backboard determining signal.

10. The electronic device of claim 8, wherein the first switch is configured to prevent current leakage from the motherboard to the HDD backboard so as to protect the HDD backboard.

11. The electronic device of claim 1, wherein the power detecting signal is a first voltage level when one of the voltage rails is failed, and the power detecting signal is a second voltage level when all of the voltage rails are normal.

12. The electronic device of claim 1, wherein the power detecting circuit is configured to receive a plurality of power good signals, wherein the power good signals are configured to reflect the status of the power rails.

\* \* \* \* \*